(12) United States Patent
Klemme et al.

(10) Patent No.: US 6,715,515 B2
(45) Date of Patent: Apr. 6, 2004

(54) STRUCTURE FOR LOADING CHEMICALS INTO SOLUTION TANKS

(75) Inventors: Kent Alvin Klemme, Ankeny, IA (US); Joshua Jacob Engelbrecht, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/230,030

(22) Filed: Aug. 27, 2002

(65) Prior Publication Data

US 2004/0040616 A1 Mar. 4, 2004

(51) Int. Cl.[7] ................................................. B65B 3/00
(52) U.S. Cl. ............................ 141/18; 141/67; 141/70; 141/91
(58) Field of Search ........................ 141/2, 5, 7, 67, 141/70, 85, 89, 91, 98, 18

(56) References Cited

U.S. PATENT DOCUMENTS 4,171,710 A * 10/1979 Boynton et al. ............ 137/238
5,398,733 A * 3/1995 Welch ........................... 141/4
5,900,216 A * 5/1999 Nickens et al. ............ 422/168

OTHER PUBLICATIONS

Page 10 of Ag–Chem Terra–Gator brochure dated 9/01.

* cited by examiner

Primary Examiner—Gregory L. Huson
Assistant Examiner—Peter deVore

(57) ABSTRACT

A chemical loading system includes a venturi located at the top of the solution tank to reduce the fluid mass that has to be lifted into the tank. An anti-bridging nozzle at the outlet of the eductor hopper assures that material is pushed into the vacuum created by the venturi. To reduce air space in the granular material and increase pull by the venturi vacuum, fluid is directed to the material through the anti-bridging nozzle and through a rinse ring around the top of the hopper. The rinse ring, also used to rinse the hopper after loading the material and provide structural rigidity, includes a rolled edge at the top of the hopper walls with notches in the edge of the ring to provide improved placement of rinsing solution.

15 Claims, 5 Drawing Sheets

STRUCTURE FOR LOADING CHEMICALS INTO SOLUTION TANKS

FIELD OF THE INVENTION

The present invention relates generally to chemical spraying systems and more specifically to a chemical loading system.

BACKGROUND OF THE INVENTION

Eductors are often used to transfer chemical concentrate from a container to a main solution tank on an implement such as an agricultural sprayer. Most conventional eductors are bulky and heavy and require much mounting space and a hefty lift structure for movement between a loading position convenient for operator access and an out of the way storage position for spray and transport operations. Many currently available eductors do not have closed transfer technology capabilities and therefore are limited in use. In addition, loading liquid chemical is often a slow process using an eductor. In most conventional systems, a venturi is located at the bottom of a hopper or at a location in the vacuum line such that there is a considerable mass of material to lift. Such arrangements adversely affect venturi efficiency and increase loading time.

Loading the dry chemical through the tank lid is not only slow but also a very labor intensive process. However, loading dry chemical with an eductor is also very slow, and bridging of dry material at the bottom of the hopper is a common problem. Since granular materials can have considerable air space, the venturi created vacuum often does not effectively draw the dry material.

The hopper area needs to be thoroughly cleaned between loading of different chemicals, and presently available systems have shapes that are difficult to rinse and require special plumbing arrangements for rinse water. The rinsing arrangements often do not reach all areas of the hopper walls.

SUMMARY OF THE INVENTION

It is therefore an object of the present invention to provide an improved chemical loading system for a solution tank on an agricultural sprayer or similar implement. It is a further object to provide such a system which overcomes most or all of the aforementioned problems.

It is another object of the present invention to provide an improved chemical loading system for a solution tank which is lighter and requires less space than most previously available loading systems. It is another object to provide such a system which is easier to move between operating and storage positions.

It is a further object to provide such a system which loads faster and is more convenient to access than most previously available loading systems and reduces the chemical handling time of the operator. It is another object to provide such a system which has an improved hopper flow path and venturi location.

It is another object of the present invention to provide a chemical loading system with faster loading, improved clean-out and an improved rinse structure.

It is yet another object to provide an improved chemical loading system which facilitates closed transfer and closed clean-out operations.

It is a further object of the invention to provide an improved chemical loading system which effectively loads dry chemicals. It is another object to provide such a system which reduces air space in the dry chemicals thereby providing better material draw by the venturi. It is still another object to provide such a system which includes a combination of a rinse ring at the top of the hopper, an improved venturi location and an anti-bridging nozzle.

It is yet another object to provide an improved chemical loading system having a unique hopper construction which is compact and relatively inexpensive. It is still another object to provide such a system having a strategically located rinse ring which increases rigidity and directs rinse fluid to all areas of the hopper for improved hopper cleaning. It is a further object to provide such a structure wherein the rinse ring forms a smooth upper hopper edge portion.

The chemical loading system or eductor includes a venturi located at the top of the solution tank to significantly improve performance by reducing the time to load chemicals. Compared to a venturi at the bottom of the hopper or elsewhere in the vacuum line, the top of the tank venturi location reduces the fluid mass that has to be lifted into the tank, therefore increasing the venturi efficiency. The eductor decreases the load time by increasing the flow rate of the venturi by placing it at the top of the tank and adding an anti-bridging nozzle at the outlet of the eductor hopper. The nozzle ensures that material is pushed into the vacuum created by the venturi.

To reduce air space in the granular material and increase pull by the venturi vacuum, fluid is directed to the material through the nozzle and through a rinse ring around the top of the hopper. The fluid and granular mixture, without air spaces, can be pulled by the venturi very efficiently. The rinse ring, also used to rinse the hopper after loading the material, includes a rolled edge at the top of the hopper walls with notches in the edge of the ring to provide improved placement of the rinsing solution. The rolled edge defines the rinse tube, a smooth protective edge upper, and structural rigidity to the lightweight hopper. By forming the rinse ring in a single process, material and manufacturing costs are reduced while providing the above-mentioned features.

The lighter weight and more compact hopper design reduces the need for a spring assist lift linkage, therefore also reducing cost and complexity. The hopper capacity is preferably on the order of 5.5 U.S. gallons while some current designs are approximately 6.5 gallons. The shape of the improved eductor opens space up on the sprayer for other options. A sleek bottom shape on the eductor is pleasing to the eye, compact and smooth so that easy clean-out and an easy flow path for a non-splash pour of chemicals are provided. The eductor also includes a flat accessible lid for the mounting of connections to be used with chemical containers for the use of closed transfer technology.

These and other objects, features and advantages of the present invention will become apparent upon reading the following detailed description in view of the drawings.

DESCRIPTION OF THE PREFERRED EMBODIMENT

Figure 1:
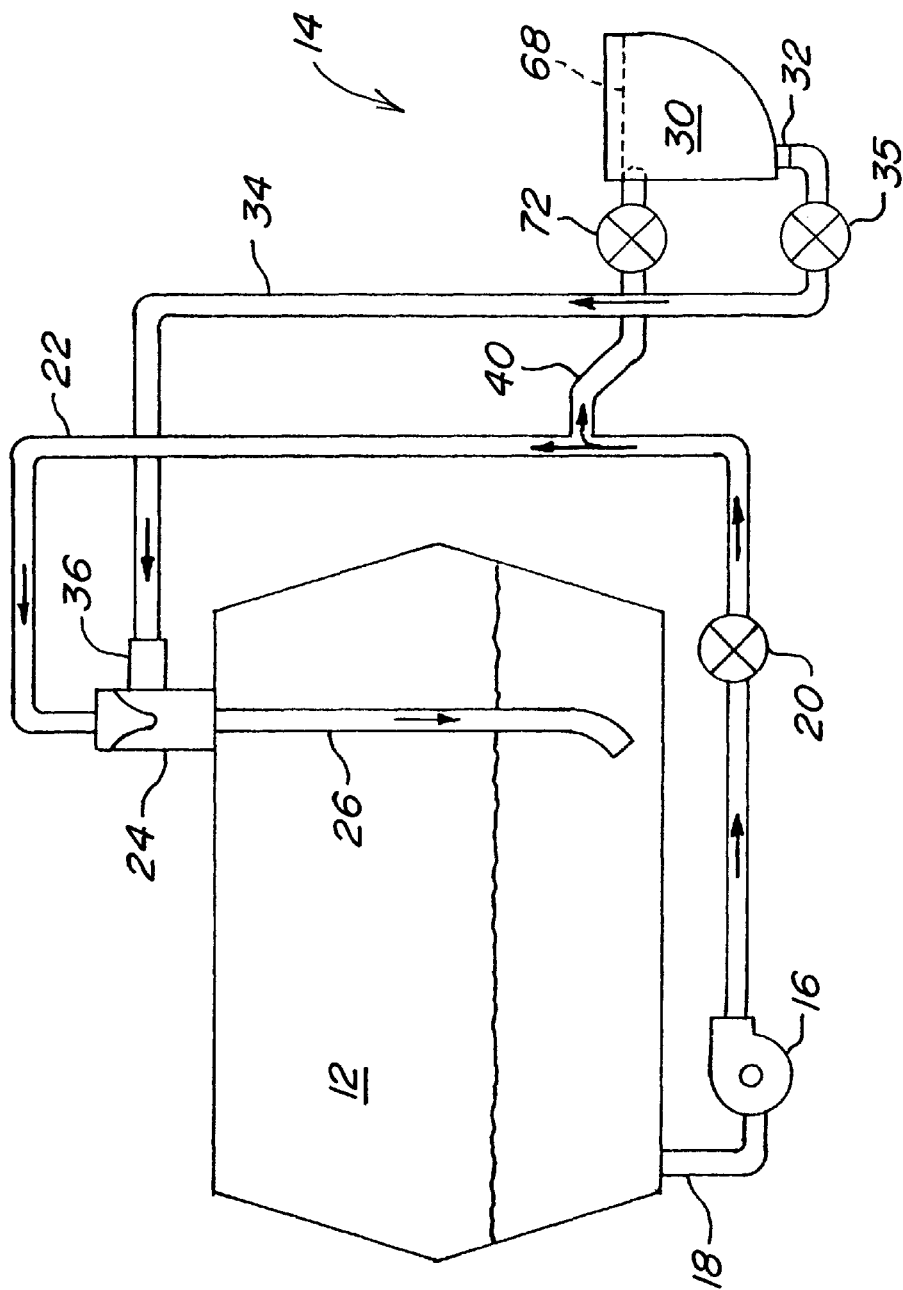
FIG. 1 is a schematic representation of a portion of a sprayer solution system for an agricultural sprayer having an eductor.
Figure 2:
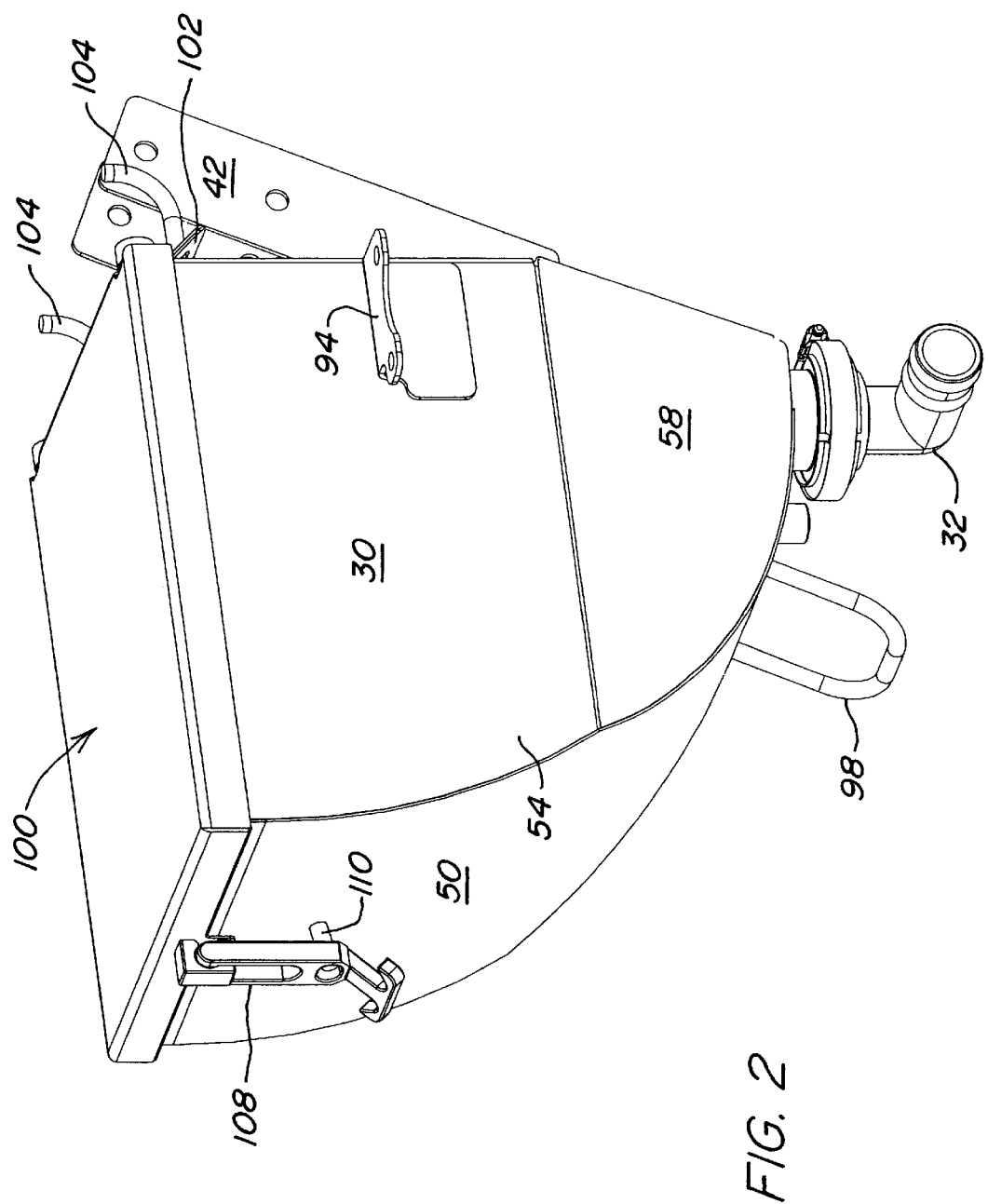
FIG. 2 is an enlarged perspective view of hopper structure for the eductor for the system of FIG. 1.
Figure 3:
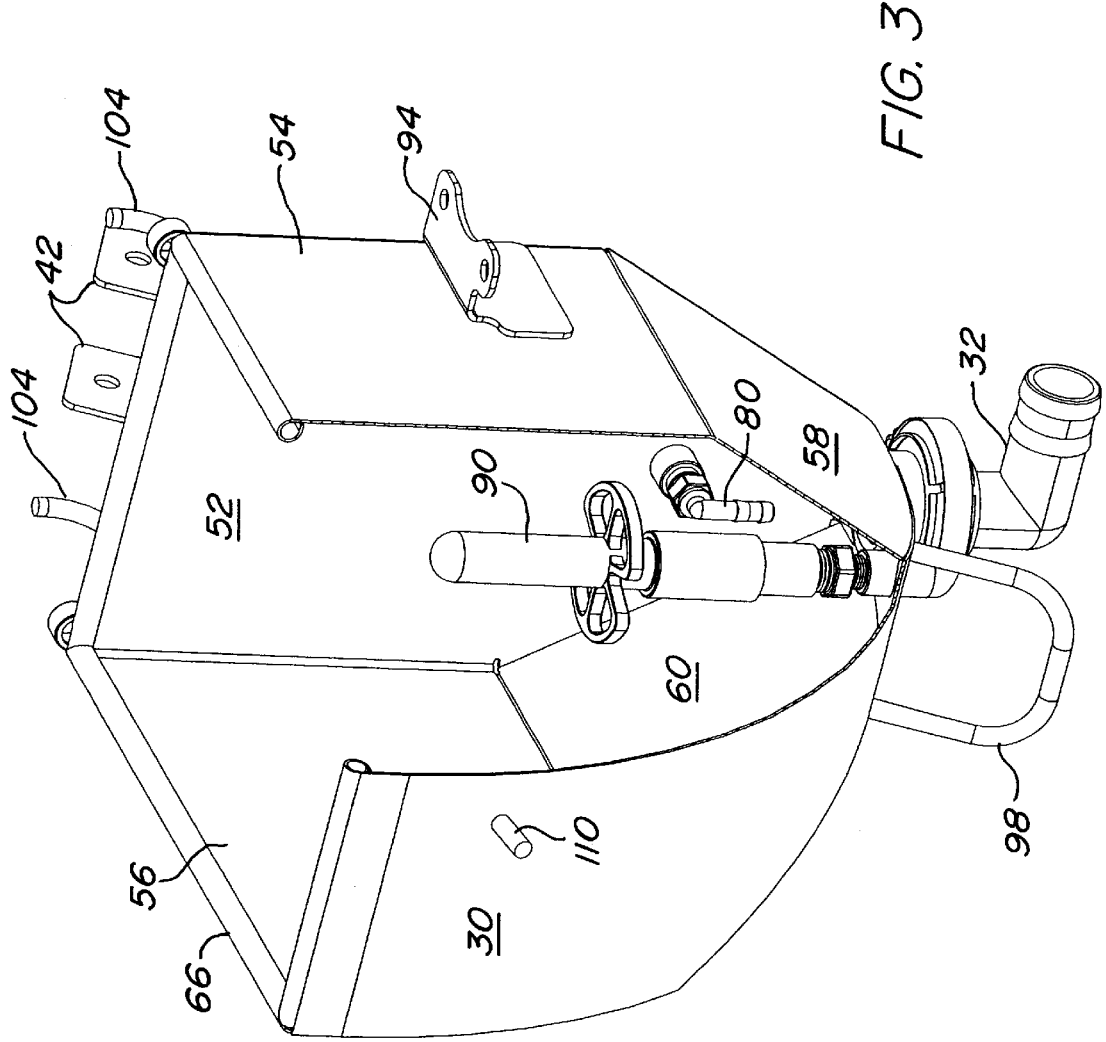
FIG. 3 is a view similar to FIG. 2 but with portions of the hopper structure removed or broken away to better show the interior of the hopper.
Figure 4:
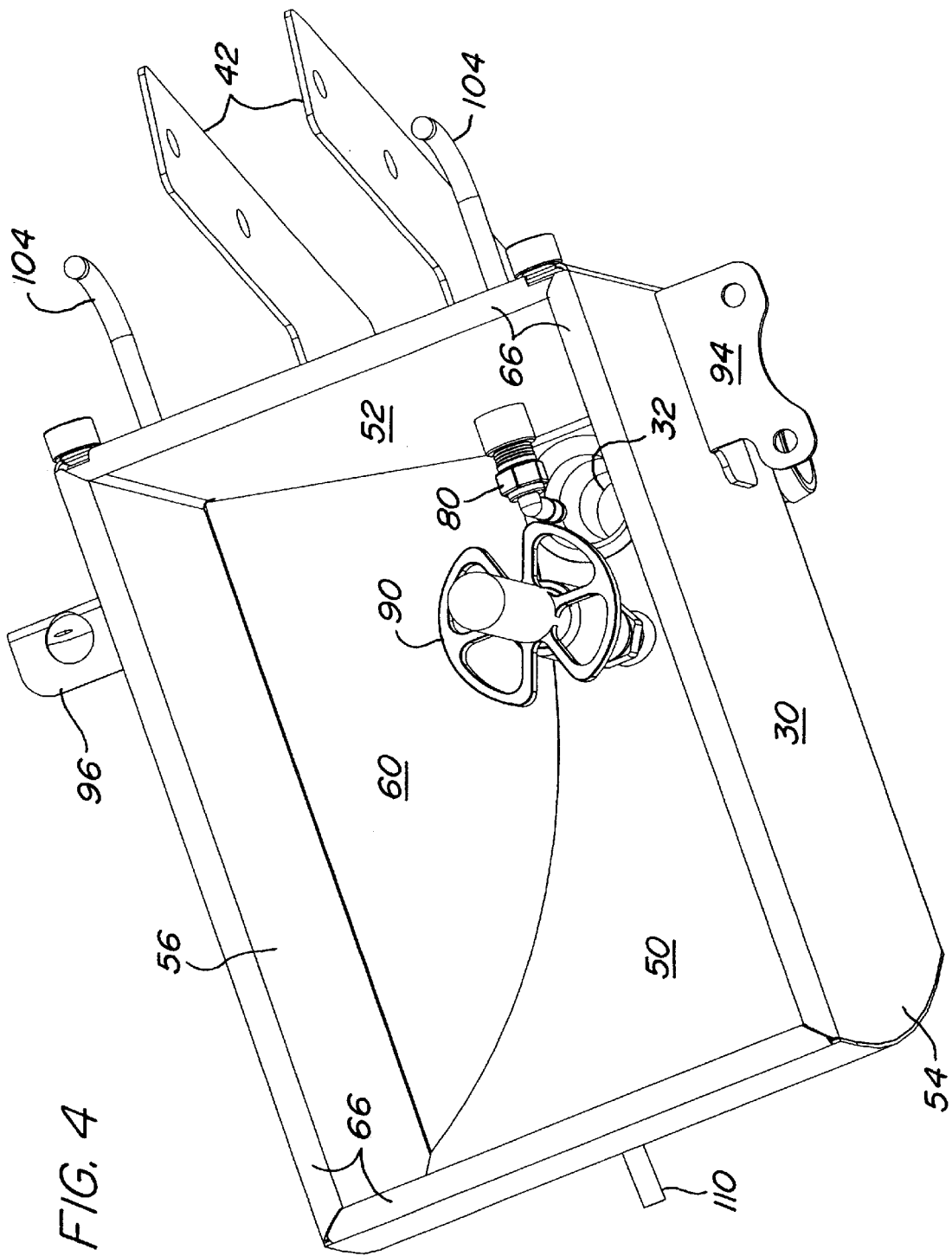
FIG. 4 is a top perspective view of the hopper structure with the lid removed.

Referring to FIG. 1, therein is shown a portion 10 of an agricultural sprayer including a solution tank 12 having an eductor system indicated generally at 14 for adding chemicals to the solution tank 12. A solution pump 16 has an input side connected to a tank lower outlet 18. The pressure side of the pump 16 is connected through an eductor control valve 20 and venturi pressure line 22 to a venturi 24 located at the top of the solution tank 12. A dip tube 26 directs material from the venturi 24 to the lower portion of the tank 12.

The eductor system 14 includes a hopper 30 having a lower hopper outlet 32 connected by a venturi vacuum line 34 and control valve 35 to a vacuum inlet 36 on the venturi 24. As solution is pumped through the venturi pressure line 22 and the venturi 24, a vacuum is produced at the inlet 36 and in the line 34 to draw material to be mixed into the solution from the hopper outlet 32. By placing the venturi 24 at the top of the solution tank 12 rather than at a lower location, the vacuum line 34 has significantly less mass to lift into the tank, and venturi efficiency is increased for faster material delivery.

Figure 5:
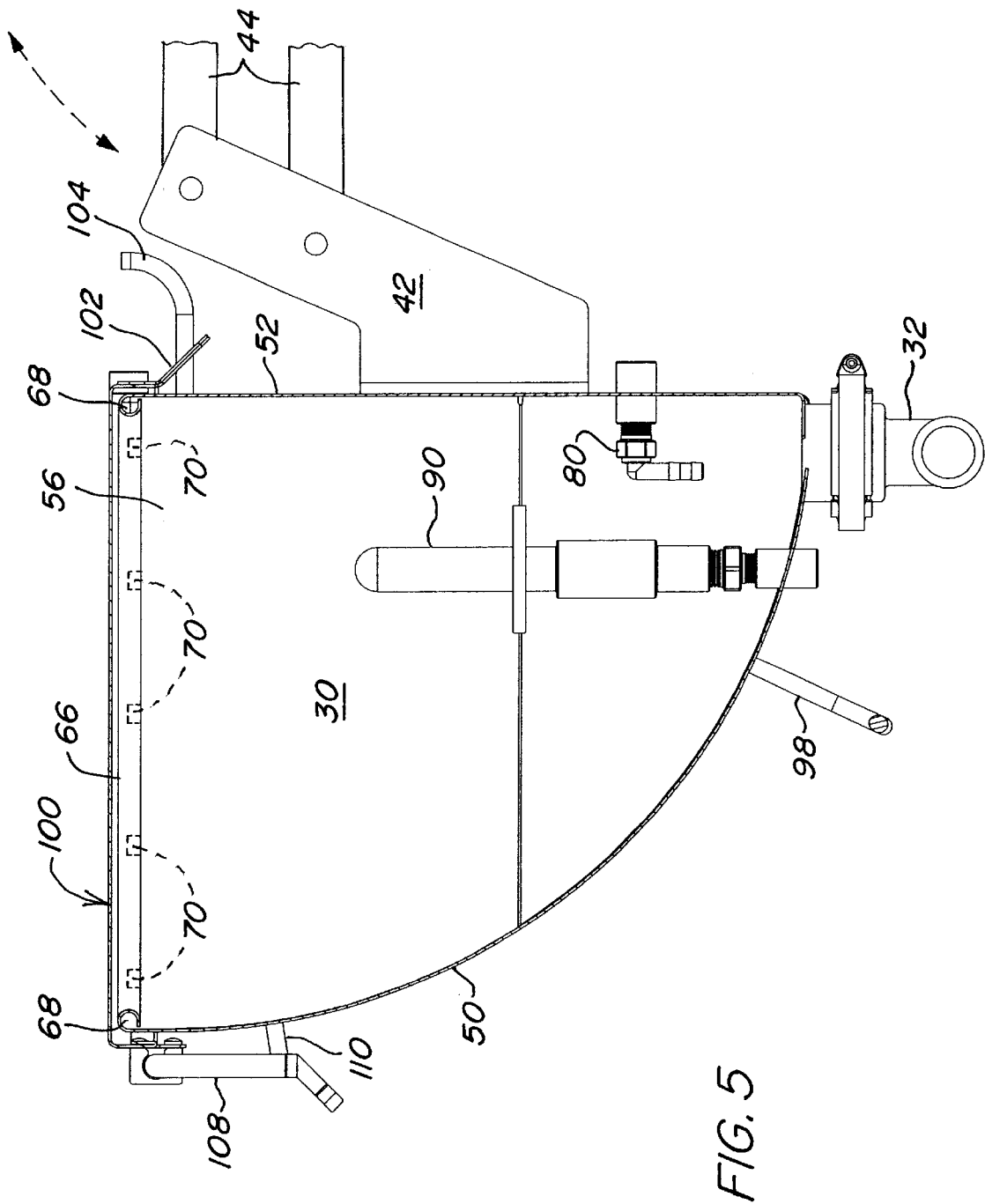
FIG. 5 is a side view of the hopper structure, partially in section.

The eductor system 14 also includes a rinse supply line 40 connected to the pressure line 22 to provide rinse and anti-bridging functions described in detail below. The hopper 30 includes support brackets 42 (FIGS. 2–5) connected to a convention lift or pivot system indicated generally at 44 in FIG. 5, and the connecting lines 34 and 40 to the hopper 30 are flexible so the structure can pivot upwardly and inwardly to a storage position for transport and spraying operations. When chemical is to be loaded, the hopper 30 is swung downwardly and outwardly to a convenient operator-accessible location.

Referring now to FIGS. 2–5, the advantageous features of the hopper 30 which provide improved operation including better flow resulting in faster loading, reduced bridging and better clean-out will be described in detail. The hopper 30 includes a gently curved, generally arcuate front panel 50 and an upright, generally planar rear wall 52 connected by upper, upright side walls 54 and 56 and lower angled walls 58 and 60 converging towards the outlet 32. The sleek, gently curving front and bottom area of the hopper 30 not only provides a compact structure but also defines an easy flow path for the material being added and reduces or eliminates splashing when liquid chemical is added.

The hopper 30 as shown has a capacity of approximately 5.5 U.S. gallons, which is approximately one gallon less than typical previously available systems. The hopper 30 accommodates a conventional chemical container. As can be appreciated from the drawings, the upper opening of the hopper 30 is rectangular in configuration and provides a compact profile which minimizes space requirements on the sprayer. The area around the opening includes a rolled upper edge 66 forming a continuous channel or rinse ring 68 around the top of the hopper 30. The rolled edge 66 also eliminates sharp edges and increases the structural rigidity of the hopper 30. The rinse ring 68 includes slotted areas 70 above the side walls 54 and 56 spaced about 2.5 inches apart and approximately 0.118×0.187 inch dimension. Each slot has a curved front edge to help catch fluid and direct it onto the side walls 54 and 56. The rinse ring 68 is selectively connected to the pressure line 40 through a valve 72 for rinsing and/or anti-bridging operations. The rinse ring 68 can be formed in a single process with the hopper walls so that material and manufacturing costs are reduced. The ring 68 also eliminates the need to support extra plumbing within the hopper 30.

An anti-bridging or material egress assisting nozzle 80 is supported above the hopper outlet 32. The nozzle 80 is connected to the rinse supply line 40 and directs pressurized rinse solution downwardly towards the outlet 32. The nozzle 80 helps force material into the outlet 32 and breaks up material which would otherwise bridge across the outlet and slow the loading process. The combination of the action of liquid from the rinse ring 68 and flow from the nozzle 80 provides a very effective material movement action which is particularly useful when dry chemicals are loaded. This action in combination with the location of the venturi 24 at the top of the tank 12 results in significant loading improvement over previously available systems, and hopper size can be reduced.

A container receiver 90 is supported from the bottom of the hopper 30 and is spring-loaded upwardly. By inverting the mouth of the chemical container over the receiver 90, material from the container is directed into the hopper 30. The receiver 90 is also connected to the pressure line 40 which supplies pressurized rinse fluid spray to rinse the chemical completely out of the container when a valve (not shown) is opened as the receiver 90 is pushed downwardly against the bias.

Brackets 94 and 96 (FIG. 4) support the valves 35 and 72 from the hopper sides 54 and 56, respectively, and are conveniently accessible by the operator when the hopper 30 is pivoted downwardly and outwardly to the loading position. A handle 98 is fixed to the lower portion of the hopper 30 to assist the operator in moving the hopper between positions.

Lid structure 100 fits over the rolled edge 66 to close the hopper 30. Hinges 102 are slidably received over upwardly bent support lugs 104 connected to the rear wall 52 of the hopper 30 so the lid can be easily opened and removed if desired. A forward latch 108 is received by a mating latch member 110 connected to the wall 50 to secure the lid in a locked position. The top of the lid structure 100 is flat and accessible for mounting of connections (not shown) for use with closed transfer chemical container systems.

Having described the preferred embodiment, it will become apparent that various modifications can be made without departing from the scope of the invention as defined in the accompanying claims.

What is claim is:

1. A chemical loading system for an agricultural implement such as a sprayer having a solution tank with an inlet located near the top of the tank for receiving fluid flow therethrough, the loading system including:
    an upright hopper for receiving a chemical, the hopper having top and bottom portions and side walls;
    a lower outlet located in the bottom portion;
    a venturi located at the inlet near the top of the tank and providing a vacuum as fluid flows through the inlet;
    a conduit connecting the lower outlet with the venturi to draw the chemical into the solution tank with the pumping of the fluid through the inlet; and
    a nozzle supported above the lower outlet for directing fluid towards the outlet and urging chemical into the vacuum.

2. The loading system as set forth in claim 1 further comprising a flush channel located at the top portion and connected to a source of flush fluid under pressure for directing fluid into contact with the chemical and cooperating with the nozzle to assure movement of the chemical into the vacuum.

3. The loading system as set forth in claim 1 including valve structure located on the hopper for selectively supplying fluid to the nozzle.

4. The loading system as set forth in claim 1 wherein the upright hopper further includes a gently curved front wall forming an anti-splash surface for the chemical.

5. A chemical loading system for an agricultural implement such as a sprayer having a solution tank with an inlet located near the top of the tank for receiving fluid flow therethrouqh, the loading system including:

an upright hopper for receiving a chemical, the hopper having top and bottom Portions and side walls;

a lower outlet located in the bottom portion;

a venturi located at the inlet near the top of the tank and providing a vacuum as fluid flows through the inlet;

a conduit connecting the lower outlet with the venturi to draw the chemical into the solution tank with the pumping of the fluid through the inlet; and a flush channel formed integrally with the top portion and connected to a source of flush fluid under pressure for directing flush fluid against the side walls.

6. The loading system as set forth in claim 5 wherein the flush channel comprises an encircling ring with opening structure, the ring extending generally completely around the top portion and providing flush fluid against substantially all areas of the side walls.

7. The loading system as set forth in claim 6 wherein the ring comprises a rolled portion of the top portion of the hopper to provide rigidity and a smooth upper surface to the hopper.

8. A chemical loading system for an agricultural implement such as a sprayer having a solution tank with an inlet located near the top of the tank for receiving fluid flow therethrough, the loading system including:

an upright hopper for receiving a chemical, the hopper having top and bottom portions and side walls;

a pressure line for providing pressurized fluid;

a lower outlet located in the bottom portion;

a venturi located at the inlet near the top of the tank and connected to the pressure line, the venturi providing a vacuum as fluid flows through the inlet from the pressure line;

a conduit connecting the lower outlet with the venturi to draw the chemical into the solution tank with the pressurized fluid; and an anti-bridging nozzle located in the hopper above the lower outlet and selectively connectible to the pressure line to direct some of the pressurized fluid against the chemical and towards the lower outlet.

9. A chemical loading system for an agricultural implement such as a sprayer having a solution tank, the loading system including:

an upright material hopper with side walls, a lower outlet and an upper edge portion, the upper edge portion having a rolled edge providing stiffness and a smooth upper surface to the hopper, wherein the rolled edge defines a channel and includes openings adjacent the side walls; and a source of rinse fluid under pressure connected to the channel and providing rinse fluid through the openings to the side walls to facilitate movement of material towards the lower outlet.

10. The loading system as set forth in claim 9 further comprising a nozzle located below the rolled edge and above the outlet, the nozzle connected to a pressurized fluid source for directing fluid towards the outlet to further facilitate movement of the material towards the lower outlet.

11. The loading system as set forth in claim 9 further comprising a venturi connected to an upper portion of the tank, a pressure line connected to the tank and supplying fluid under pressure through the venturi to the tank, a vacuum line connecting the venturi to the outlet, the material being drawn into the tank through the vacuum line.

12. The loading system as set forth in claim 11 including valve structure connecting the pressure line to the channel whereby the source of rinse fluid under pressure includes the pressure line.

13. The loading system as set forth in claim 11 wherein the hopper is movable between a storage position and a loading position and when the hopper is in the loading position, the lower outlet is located a substantial distance below the venturi.

14. A chemical loading system for an agricultural implement such as a sprayer having a solution tank with an inlet located near the top of the tank for receiving fluid flow therethrough, the loading system including:

an upright hopper for receiving a chemical, the hopper having top and bottom portions and side walls;

a pressure line for providing pressurized fluid;

a lower outlet located in the bottom portion;

a venturi located at the inlet near the top of the tank and connected to the pressure line, the venturi providing a vacuum as fluid flows through the inlet from the pressure line; and a conduit connecting the lower outlet with the venturi to draw the chemical into the solution tank with the pressurized fluid including a hopper rim portion extending around the top portion providing rigidity to the hopper, the rim portion including an apertured channel connected to the pressure line for rinsing the chemical from the side walls and directing the chemical to the lower outlet.

15. The loading system as set forth in claim 14 including an anti-bridging nozzle located in the hopper above the lower outlet and selectively connectible to the pressure line to direct some of the pressurized fluid against the chemical and towards the lower outlet.

* * * * *